US012571430B2

(12) United States Patent (10) Patent No.: US 12,571,430 B2

Gustafsson (45) Date of Patent: Mar. 10, 2026

(54) MACHINING UNIT AND METHOD FOR MACHINING A COMPONENT

(71) Applicant: Aktiebolaget SKF, Gothenburg (SE)

(72) Inventor: Martin Gustafsson, Trollhättan (SE)

(73) Assignee: Aktiebolaget SKF, Gothenburg (SE)

( * ) Notice: Subject to any disclaimer, the term of this patent is extended or adjusted under 35 U.S.C. 154(b) by 1046 days.

(21) Appl. No.: 17/564,283

(22) Filed: Dec. 29, 2021

(65) Prior Publication Data

US 2022/0221002 A1 Jul. 14, 2022

(30) Foreign Application Priority Data

Jan. 11, 2021 (DE) .......................... 102021100314.8

(51) Int. Cl.
| | |
|---|---|
| *F16C 33/64* | (2006.01) |
| *B24B 19/00* | (2006.01) |
| *B24B 21/16* | (2006.01) |
| *B24B 33/08* | (2006.01) |
| *B24B 49/16* | (2006.01) |
| *B25J 9/16* | (2006.01) |
| *B25J 11/00* | (2006.01) |

(52) U.S. Cl.
CPC .............. *F16C 33/64* (2013.01); *B24B 19/00* (2013.01); *B24B 21/16* (2013.01); *B24B 33/082* (2013.01); *B24B 49/16* (2013.01); *B25J 9/1664* (2013.01); *B25J 11/0065* (2013.01); *F16C 2220/70* (2013.01); *F16C 2240/54* (2013.01); *F16C 2240/56* (2013.01)

(58) Field of Classification Search
CPC ..... B24B 27/0038; B24B 19/26; B24B 47/22; B24B 21/16; B24B 33/082; B24B 49/16; B25J 11/0065; B25J 9/1664; F16C 33/64
See application file for complete search history.

(56) References Cited

U.S. PATENT DOCUMENTS

| | | | | |
|---|---|---|---|---|
| 3,330,075 A | * | 7/1967 | Suddarth | B24B 13/02 74/42 |
| 5,077,941 A | * | 1/1992 | Whitney | B24B 49/16 451/6 |
| 5,126,645 A | * | 6/1992 | Yoshimi | G05B 19/39 318/568.22 |
| 5,148,632 A | * | 9/1992 | Adler | B24B 41/04 451/232 |
| 5,265,195 A | * | 11/1993 | Jinno | B25J 11/0065 901/41 |
| 5,299,389 A | * | 4/1994 | Yonaha | B25J 9/1684 451/5 |
| 5,565,749 A | * | 10/1996 | Jinno | B25J 9/1684 318/566 |
| 5,711,697 A | * | 1/1998 | Taninaga | B24B 49/16 451/6 |

(Continued)

*Primary Examiner* — Joel D Crandall

(74) *Attorney, Agent, or Firm* — The Garcia-Zamor Law Firm; Ruy Garcia-Zamor

(57) ABSTRACT

Disclosed is a machining unit for machining a bearing component. The machining unit includes an industrial robot and at least one abrasive tool. The at least one abrasive tool is coupled to the industrial robot and a controller. The controller is configured to control a movement path of the at least one abrasive tool such that a contact of the abrasive tool is in the normal direction to a surface of the component.

6 Claims, 2 Drawing Sheets

(56)         References Cited

U.S. PATENT DOCUMENTS

| | | | |
|---|---|---|---|
| 6,380,512 B1 * | 4/2002 | Emer | F01D 5/005 |
| | | | 219/121.85 |
| 2010/0305745 A1 * | 12/2010 | Iriguchi | G05B 19/4097 |
| | | | 700/186 |
| 2015/0005923 A1 * | 1/2015 | Gu | B24B 27/0038 |
| | | | 901/41 |
| 2017/0173759 A1 * | 6/2017 | Colletti | B24B 27/0092 |
| 2018/0056480 A1 * | 3/2018 | Tegoeh | B24B 49/003 |
| 2018/0161952 A1 * | 6/2018 | Gu | B24B 27/0038 |
| 2020/0171620 A1 * | 6/2020 | Aubin | B24B 49/12 |

* cited by examiner

MACHINING UNIT AND METHOD FOR MACHINING A COMPONENT

CROSS-REFERENCE TO RELATED APPLICATIONS

This application claims priority to German Patent Application no. 102021100314.8, filed Jan. 11, 2021, the contents of which is fully incorporated herein by reference.

FIELD OF THE INVENTION

The present invention relates to a machining unit for machining a component, particularly a bearing component. The present invention relates further to a method for machining a component, particularly a bearing component.

BACKGROUND OF THE INVENTION

One step in finishing a bearing component is the machining with an abrasive tool to provide a smooth component surface. This is generally achieved using a honing stone that is moved over the surface of the bearing component. Depending on the size of the component, this procedure may be rather time consuming. Also, an orientation of the honing stone with regard to the surface of the component may vary such that the material removal capacity of the honing stone is not used to full capacity which may also lead to longer machining times.

Furthermore, even slight misalignments of the honing stone may lead to a lower or a higher removal rate which results in an uneven surface of the component. Usually, the movement path of the honing stone has to be manually adjusted and is less flexible regarding adaptions for different movement paths, which may also lead to longer total machining times.

It is therefore object of the present invention, to provide an improved machining unit for machining a component, which also allows for more flexibility in the machining of the component.

SUMMARY OF THE INVENTION

In the following a machining unit for machining a component, particularly a bearing component, is provided. The machining unit comprises an industrial robot, at least one abrasive tool, wherein the at least one abrasive tool is coupled to the industrial robot, and a controller. For example, the component may be a large bearing component, such as a bearing ring having a diameter larger than 400 mm, or a small bearing component, such as a rolling element with a smaller diameter. Preferably, the at least one abrasive tool is an abrasive stone or an abrasive belt. Furthermore, the at least one abrasive tool may be configured to operate in dry and/or wet conditions, in which a water-based or oil-based cutting fluid is used.

To provide a more efficient and flexible machining of the component, the controller is configured to control a movement path of the at least one abrasive tool such that a contact of the abrasive tool is in the normal direction to a surface geometry of the component. This allows for a precise and efficient removal of excess material on the component surface. More particularly, controlling the movement path of the at least one abrasive tool such that the contact of the abrasive tool is in the normal direction to the surface geometry of the component has the advantage that the abrasive tool is always in a defined orientation to the surface of the component which avoids that the abrasive tool removes more or less material depending on the contact angle between the abrasive tool and the surface.

For example, a bearing component, in particular a large diameter rolling bearing, manufactured by the machining unit may have an arithmetic average surface roughness Ra of less than 0.5 μm, preferably between 0.05 μm and 0.5 μm depending on surface to be machined.

However, other surface types, such as chamfers, may have wider requirements. With other words, the described machining unit allows an improved surface quality which results also in an improved appearance of the bearing component. Furthermore, a compressive residual stress may be improved in the component. Moreover, the machining unit offers a high flexibility regarding adaptions for different movement paths, which may reduce the total machining time of the component.

According to a further embodiment of the invention the machining unit further comprises a load sensor which is configured to measure a load applied to the component by the at least one the abrasive tool. This has the advantage that a uniform material removal can be achieved. For example, the load sensor may be configured to measure the applied load in three independent axes and to calculate form these three load measurements the load applied in the normal direction of the component surface based on the surface geometry of the component.

Preferably, the controller is configured to control the motion of the industrial robot, and the at least one abrasive tool based on the measured load. For example, the controller may control the industrial robot and the at least one abrasive tool such that a force applied to the component by the at least one abrasive tool is constant. Preferably, the load is measured continuously, and the controller is configured to compare the measured load with a reference load stored in a storage device in the controller and adapt the applied load such that a difference between the measured load and the reference load is smaller than a predefined threshold value. The reference load may be experimentally predetermined.

For example, the threshold value may be 1% of the reference load. This has the further advantage that changes in the applied load caused by changes in a curvature of the component surface can be compensated. Preferably, a produced form deviation of the bearing component surface is less than 15 μm, preferably between 0 μm and 15 μm depending on the component and the surface to be machined.

Furthermore, the controller may be configured to determine when the machining is finished based on a calculated finishing time $t_f$ of the at least one abrasive tool and/or a measured amount of removed material, wherein $t_f$ is calculated as the quotient of the volume to be removed V and a material removal rate MRR, $t_f{=}V/MRR$, wherein the material removal rate MRR is calculated as product of the specific material removal rate capacity $Q'$ and the axial contact width of the at least one abrasive tool $w_a$, $MRR{=}Q'{*}w_a$, and wherein V is the volume to be removed. For a rotational symmetric bearing component, V is determined by the formula:

$$V = \int_{S(x)-\Delta}^{S(x)} \int_A^B 2\pi S(x)\, \delta x\, \delta \Delta$$

wherein S(x) is the parameterized movement path on the surface of the component, Δ is the material width to be removed, and A and B are the start point and end point of the movement path. Controlling when the machining is finished has the advantage that there is no risk that too much or too little material is removed. Thereby making the machining process more efficient and allowing to achieve a bearing component having an improved surface integrity and/or reduced produced form deviation in less time. More particularly, "too little" or insufficient material removal can occur if a surface texture that was machined in a previous operation has to be removed to set a new texture.

According to another embodiment, the machining unit further comprising a holder configured to hold the component, wherein the holder is configured to rotate the component, and the controller is further configured to control a rotational speed of the component. In particular, the holder may directly rotate the component and/or may indirectly rotate the component, for example by rotating a fixture that retains the component. For example, the holder itself may be configured to rotate. Preferably, the movement path of the at least one abrasive tool is directed towards the rotation axis around which the component is rotated.

Preferably, the at least one abrasive tool is configured to incorporate rotational motions and/or to rotate, and wherein the controller is configured to control a rotational speed and/or rotation direction of the at least one abrasive tool. For example, the rotational motion may be a rotation of the abrasive belt or a rotation to enable a honing stone oscillation via an eccentric.

According to another embodiment, the controller is configured to control the rotational speed of the component and the rotational speed of the at least one abrasive tool such that a ratio of the rotational speed of the at least one abrasive tool to the rotational speed of the component is unequal to an integer or a half integer. Preferably, an error in a rotational speed of the at least one abrasive tool is less than ±0.5% of a target value, and/or an error in a rotational speed of the component is less than ±0.5% of a target value.

This allows to reduce the occurrence of areas in circumferential direction that may be machined slightly more or less due to superposition effects, which increases an overall quality of the finished surface of the component. In particular, the produced form deviation of the component and the arithmetic average surface roughness Ra may be reduced. More particularly, the produced form deviation may be less than 15 μm, preferably between 0 μm and 15 μm, and the arithmetic average surface roughness Ra of the machined surface may be of less than 0.5 μm, preferably between 0.05 μm and 0.5 μm. Other surfaces may have wider requirements.

According to another embodiment, the machining unit further comprises a tool interface which is configured to couple the at least one abrasive tool to the industrial robot. Preferably, the machining unit further comprises a second abrasive tool, wherein the tool interface is configured to automatically change the used abrasive tool. This increases a production rate of the machining unit.

According to a second aspect of the invention, a method for machining a component, particularly a bearing component, using a machining unit as described above is provided. The method comprises the step of controlling a movement path of the at least one abrasive tool such that a contact of the abrasive tool is in the normal direction to a surface geometry of the component.

An even further aspect of the present invention relates to a computer program product comprising a computer program code which is adapted to prompt a control unit, e.g., a computer, and/or a computer of the above discussed manufacturing arrangement to perform the above discussed steps.

The computer program product may be a provided as memory device, such as a memory card, USB stick, CD-ROM, DVD and/or may be a file which may be downloaded from a server, particularly a remote server, in a network. The network may be a wireless communication network for transferring the file with the computer program product.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The figures show.

In the following same or similar functioning elements are indicated with the same reference numerals.

DETAILED DESCRIPTION OF THE INVENTION

Figure 1:
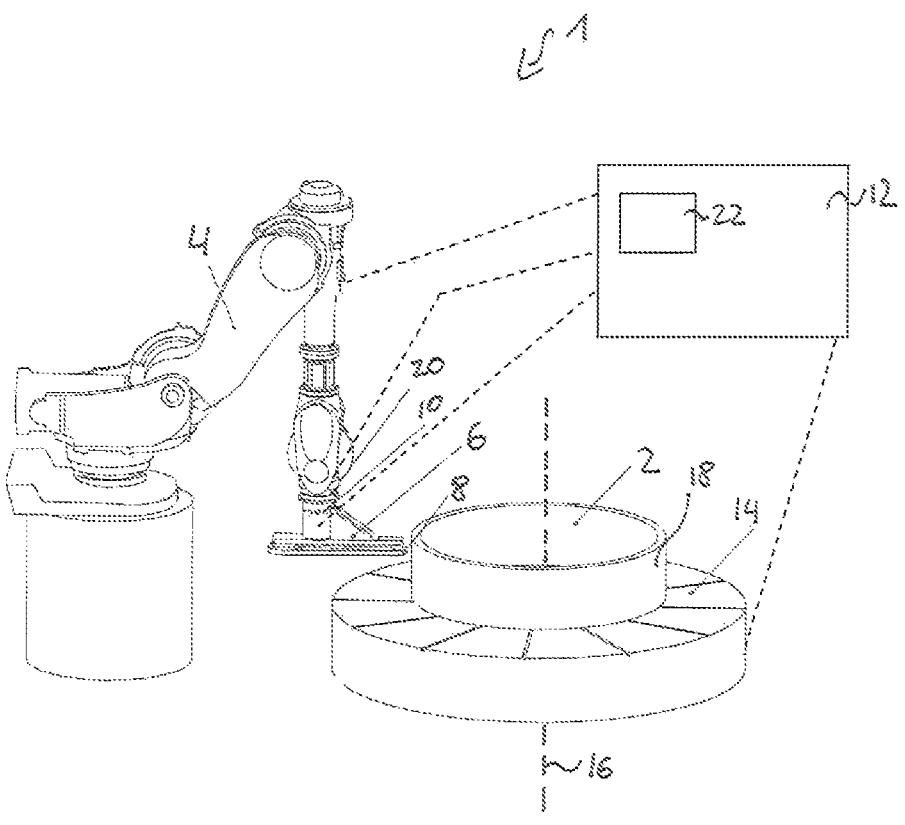
FIG. 1: a schematic view of a machining unit according to an embodiment.

FIG. 1 shows a schematic view of a machining unit 1 for machining a bearing component 2, such as a bearing ring as shown in FIG. 1. The component may be a bearing component, for example a bearing ring having a diameter larger than 400 mm as shown in FIG. 1. The machining unit 1 includes an industrial robot 4, which is equipped with an abrasive tool 6 having an abrasive belt 8. However, the abrasive tool 6 may not be limited to an abrasive belt 8 and may alternatively be an abrasive stone. An abrasive belt 8 is a belt made form a carrier material on which an abrasive material, such as aluminum oxide ($Al_2O_3$), silicon carbide (SiC) or cubic boron nitride (CBN) is provided. During operation, the abrasive belt 8 rotates. The abrasive tool 6 is coupled to the industrial robot 4 via a tool interface 10.

The component 2 is held by a holder 14. The holder 14 rotates around a rotation axis 16, which also causes the component 2 to rotate. To remove material from a surface 18 of the component 2, the abrasive tool 6 is moved over the surface 18 of the component by the industrial robot 4. These movement of the industrial robot 4 are controlled by a controller 12 of the machining 1. In particular, the controller 12 is configured to control the industrial robot 4 to cause a movement path S (FIG. 2) of the abrasive tool 6 such that a contact of the abrasive tool 6 is in the normal direction to the surface 18 of the component 2. That is, the controller 12 sends control signal to the industrial robot 4 which causes the industrial robot 4 to move the abrasive tool 6. For example, the control signals may be sent via wire, such as a LAN connection, or wireless, particularly WLAN. Moreover, the controller 12 is also configured to control the rotational speed and rotation direction of the abrasive belt 8 as well as the rotational speed of the holder 14 and consequently the component 2. More particularly, the machining unit 1 allows to reduce the form deviation of the bearing ring to be less than 15 μm, and the arithmetic average surface roughness Ra of the machined surface is less than 0.5 μm.

Moreover, the machining unit 1 comprises a load sensor 20 that measures a load applied to the component 2 by the abrasive tool 6. The load sensor 20 is arranged at the tool interface and measures the applied load in three independent axes. Preferably, the load is measured continuously. From these measured load values, the load applied in the normal direction of the component surface 18 is calculated based on the surface geometry of the component 2. Furthermore, the measured load is feedback to the controller 12 such that the controller 12 can control the motion of the industrial robot 4, and the abrasive tool 6 based on the measured load.

For example, the controller 12 may control the industrial robot 4 and the abrasive tool 6 such that the force applied to the component 2 by the abrasive tool 6 is constant. Therefore, the controller 12 is configured to compare the measured load with a reference load stored in a storage device 22 in the controller 12 and adapt the applied load such that a difference between the measured load and the reference load is smaller than a predefined threshold value. The reference load may be experimentally predetermined, and the threshold value may be 1% of the reference load. This allows to reduce the produced form deviation and the arithmetic average surface roughness Ra of the machined surface.

As mentioned above, the controller 12 is configured to control the rotation speed of the component 4 and the rotational speed of the abrasive band 8. Similar to the applied load, the controller 12 is also configured to compare the rotational speed of the belt 8 and the rotational speed of the component 2 to stored target values and adapt the respective command values such that an error in the rotational speed of the abrasive belt 8 is for example less than ±0.5% of the target value, and/or such that an error in the rotational speed of the component 2 is for example less than ±0.5% of the target value. Also, the controller 12 is configured to set the rotational speed of the component 4 and the rotational speed of the abrasive band 8 in such a way the ratio of the rotational speed of the abrasive belt 8 to the rotational speed of the component 2 is unequal to an integer or a half integer. Resulting in a produced form deviation that may be between 0 μm and 15 μm depending on the surface to be machined, and an arithmetic average surface roughness Ra of the machined surface that may be between 0.05 μm and 0.5 μm depending on surface to be machined.

Furthermore, the tool interface 10 can also accommodate a second abrasive tool (not shown) such that the tool interface 10 can automatically change the used abrasive tool based on a command of the controller 12.

In order to provide a more efficient machining of the component 2, the controller 12 is configured to determine when the machining is finished based on a calculated finishing time $t_f$ of the abrasive tool 6, wherein $t_f$ is calculated as the quotient of the volume to be removed V and a material removal rate MRR, $t_f$=V/MMR, wherein the material removal rate MRR is calculated as product of the specific material removal rate capacity Q' and the axial contact width of the at least one abrasive tool $w_a$, MRR=Q'*$w_a$, and wherein V is the volume to be removed. For a rotational symmetric bearing component 2, V is determined by the formula:

$$V = \int_{S(x)-\Delta}^{S(x)} \int_A^B 2\pi S(x) \delta x \delta \Delta.$$

Figure 2:
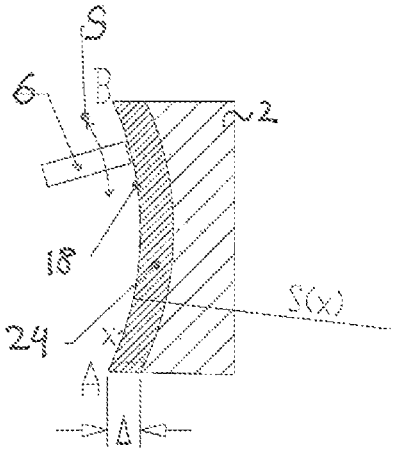
FIG. 2: a schematic diagram shown a detail of the machining unit of FIG. 1.

This calculation principle is illustrated in FIG. 2. S(x) is the parameterized movement path S on the surface 18 of the component, Δ is the material width to be removed, and A and B are the start point and end point of the movement path. The material to be removed is denoted with the reference numeral 24. The material removal rate MRR, the specific material removal rate capacity Q' and the axial contact width of the at least one abrasive tool $w_a$ are stored in the storage device 22 of the controller 12 as well. Also, the controller 12 may also be configured to determine the volume V to be removed. Alternatively, or additionally, the removed material can be measured, and the finishing time can be determined based on the measured amount of the removed material. Determining the volume of the material to be removed allows for more efficient machining process and a bearing component 2 that has an improved surface roughness. Moreover, it also allows to minimize the produced form deviation.

More particularly, the produced form deviation may be less than 15 μm, preferably between 0 μm and 15 μm depending on the surface to be machined, and the arithmetic average surface roughness Ra of the machined surface may be of less than 0.5 μm, preferably between 0.05 μm and 0.5 μm depending on the surface to be machined.

Figure 3:
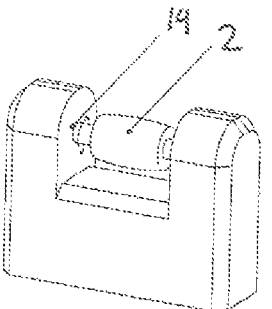
FIG. 3: a schematic view of a holder according to another embodiment.

FIG. 3 shows another embodiment of the holder 14. The holder 14 of FIG. 3 is configured to directly rotate the component 2, which is a rolling element in FIG. 3. Rotating the component 2 instead of the holder 14 is for example favorable for smaller components such as rolling elements or smaller bearing rings.

In summary controlling the movement path of the abrasive tool 6 such that the contact of the abrasive tool 6 is in the normal direction to the surface geometry of the component has the advantage that the abrasive tool 6 is always in a defined orientation to the surface of the component 2 which avoids that the abrasive tool 6 removes more or less material depending on the contact angle between the abrasive tool and the surface.

The invention claimed is:

1. A machining unit for machining a bearing component, comprising:
   an industrial robot,
   at least one abrasive tool, wherein the at least one abrasive tool is coupled to the industrial robot,
   a controller in communication with the industrial robot and configured to control the industrial robot,
   wherein the industrial robot is configured to move the at least one abrasive tool through rotational motions, and wherein the controller is configured to control a rotational speed and/or a rotation direction imparted to the at least one abrasive tool by the industrial robot,
   a holder configured to hold the component, wherein the holder is configured to rotate the component, and the controller is in communication with the holder and is configured to control a rotational speed of the component via the holder,
   the controller is configured to control the industrial robot such that a movement path(S) of the at least one abrasive tool such that a contact between the abrasive tool and a surface of the component is in a normal direction relative to the surface, wherein the controller is configured to control the rotational speed of the component and the rotational speed of the at least one abrasive tool such that a ratio of the rotational speed of the at least one abrasive tool to the rotational speed of the component is unequal to an integer or a half integer.

2. The machining unit according to claim 1, wherein the machining unit further comprises a load sensor that is configured to measure a load applied to the component by the at least one the abrasive tool.

3. The machining unit according to claim 2, wherein the controller is configured to control the motion of the industrial robot, and the at least one abrasive tool based on the measured load, such that a force applied to the component by the at least one abrasive tool is constant.

4. The machining unit according to claim 1, wherein the controller is configured to determine when the machining is finished based on a calculated finishing time tf of the at least one abrasive tool and/or a measured amount of removed material, the controller using the following formulas to determine the calculated finishing time: tf=V/MMR and MRR=Q'*wa, wherein tf is the calculated finishing time and wa is the axial contact width of the at least one abrasive tool and Q' is the specific material removal rate capacity of the at least one abrasive tool, and wherein V is the volume to be removed.

5. The machining unit according to claim 1, wherein the machining unit further comprises a tool interface that is configured to couple the at least one abrasive tool to the industrial robot.

6. The machining unit according to claim 1, wherein the at least one abrasive tool is an abrasive stone or an abrasive belt.

* * * * *